May 16, 1950        J. E. MORGAN        2,507,732
PUSHCART WITH REMOVABLE RECEPTACLE
Filed April 23, 1947        2 Sheets-Sheet 1
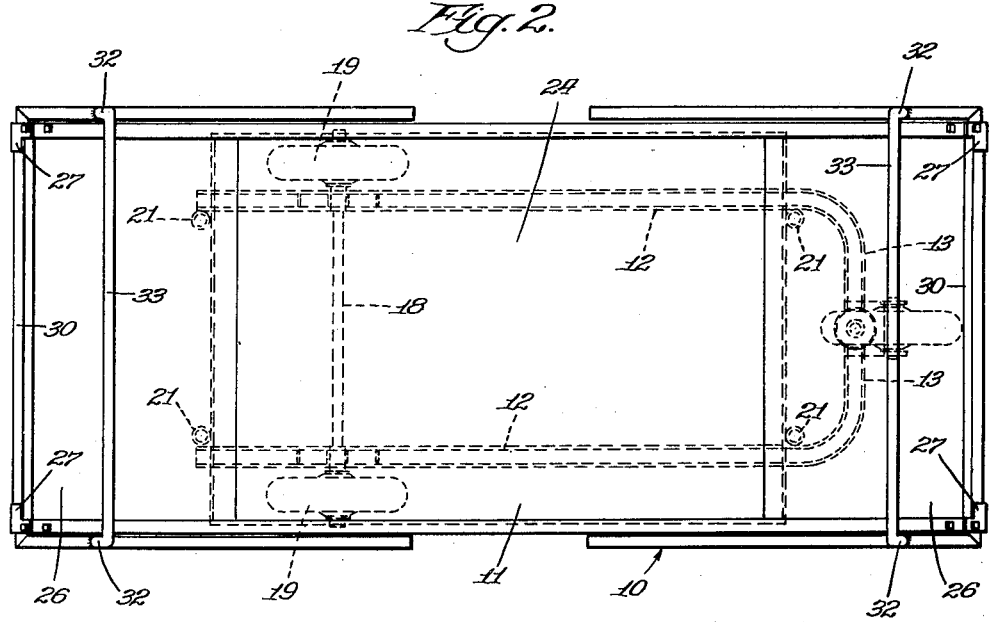
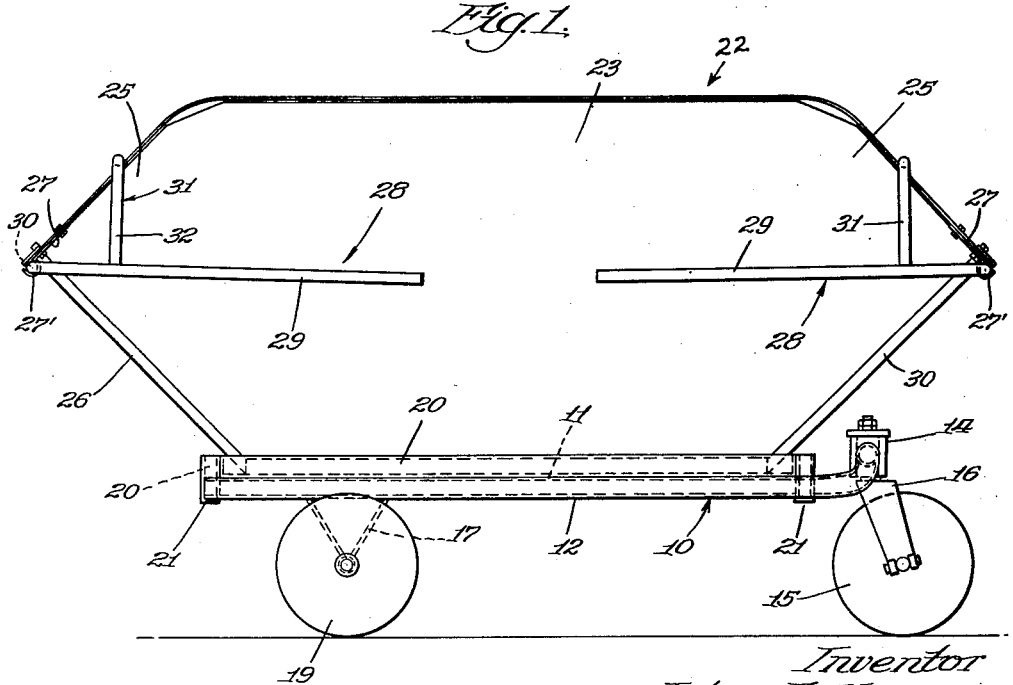
Inventor
John E. Morgan
By Paul O. Pippel
Atty.

May 16, 1950     J. E. MORGAN     2,507,732
PUSHCART WITH REMOVABLE RECEPTACLE
Filed April 23, 1947     2 Sheets-Sheet 2
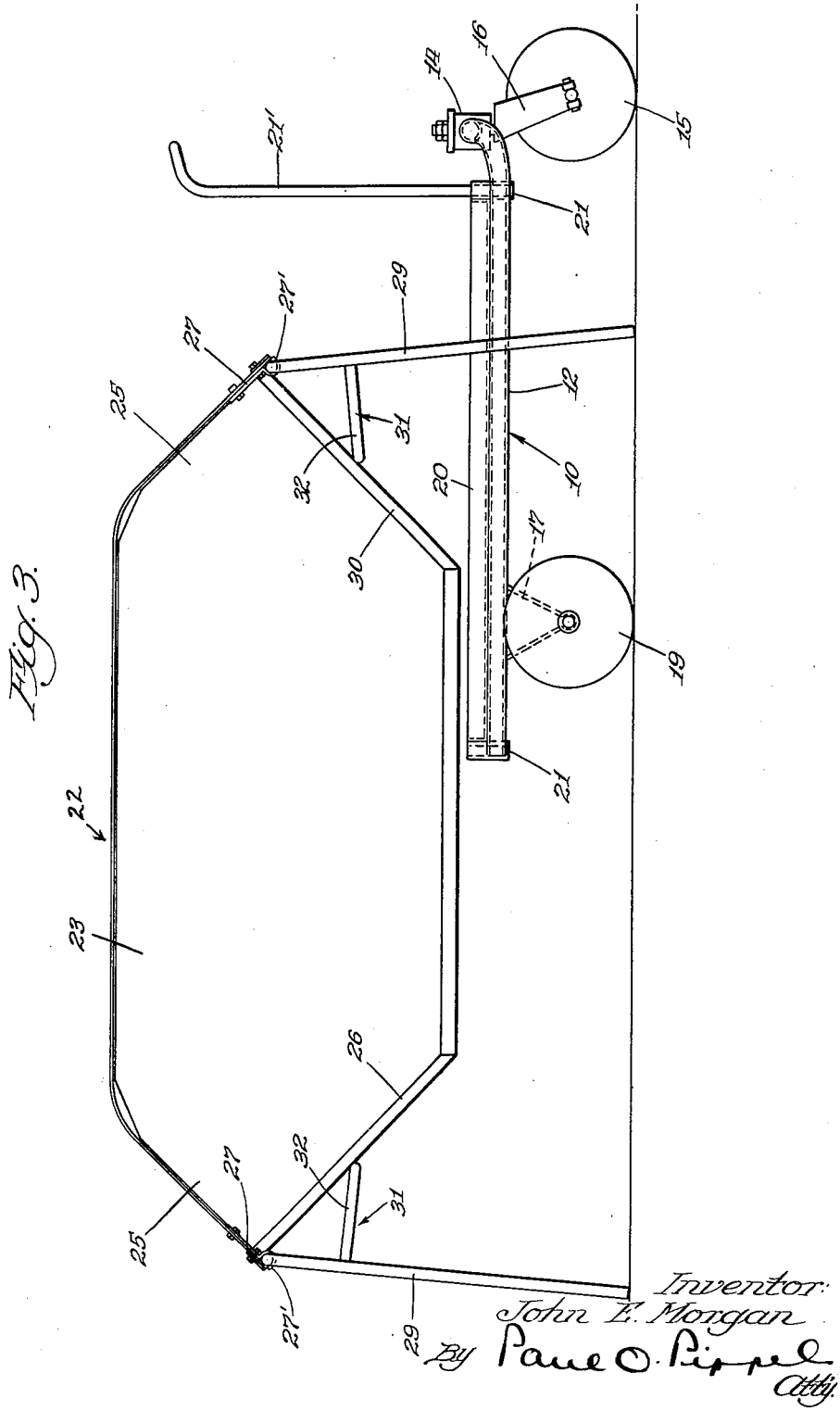

Patented May 16, 1950

2,507,732

UNITED STATES PATENT OFFICE 2,507,732

PUSHCART WITH REMOVABLE RECEPTACLE

John E. Morgan, Chicago, Ill., assignor to International Harvester Company, a corporation of New Jersey Application April 23, 1947, Serial No. 743,243

5 Claims. (Cl. 296—1)

This invention relates to a vehicle, and more particularly to a vehicle which is manually moved by an operator. More specifically, it relates to a wheel cart which is easily adapted to farm use.

It is a prime object of this invention to provide a dairy cart which may be readily utilized in connection with the handling of various chores usually present on a dairy farm. In a dairy barn it is necessary for the farmer to handle heavy objects such as milk cans and milking machine equipment, and it is desirable therefore to provide a cart which can readily be used in these tasks. In order for a cart of this type to be practicable it must serve many various purposes and it is desirable to provide means whereby the cart may also be utilized for conveying silage and ground feed around the dairy farm. Since it is desirable for a cart of this type, to be provided with a material receiving receptacle or tank, it is also desired that means be provided whereby the tank can readily be removed from the cart whenever different types of material or equipment are to be handled. In applicant's construction therefore, these novel and desirable features are provided.

Another object is to provide a dairy cart having a quickly removable receptacle which can be removed and supported on the ground independently of the cart.

Still another object of this invention is to provide a three-wheel dairy cart having a removable receptacle, said receptacle including ground supporting members which can readily be swung to a transport position when the receptacle is to be transported by the cart.

A further object is to provide a manually movable cart having a removable receptacle thereon, said receptacle having ground supporting members for supporting the receptacle independently of the cart; said ground supporting members also including members which may be used as handles adapted to be grasped by an operator for manually moving said cart when the supporting members are in their transport position.

These and other objects will more readily become apparent from a reading of the following description when examined in conjunction with the drawings.

In the drawings:

Fig. 1 is a side elevational view of a three-wheel cart having a material receiving receptacle carried thereon;

Fig. 2 is a plan view of the same; and,

Fig. 3 is a side elevational view of a three-wheel cart showing a removable receptacle for said cart supported on the ground independently of the cart.

Referring particularly to Figures 1 and 2, a manually movable vehicle or cart is generally designated by the reference character 10. The cart 10 is provided with a longitudinally extending platform 11 which is secured to a pair of rearwardly extending tubular members 12. The tubular members 12 are provided with inwardly bent tubular portions 13 which are rigidly secured to a vertical bearing member 14. A caster wheel 15 is pivotally supported at one end of the cart by means of a pivotal yoke 16 which is freely journaled in the bearing member 14. Connected to the other end of the rearwardly extending tubular members are a pair of transversely spaced brackets 17 which are rigidly secured to said tubular members. The brackets 17 have secured thereto a transversely extending shaft 18 having its end portions projecting outwardly with respect to the rearwardly extending tubular members. A pair of spaced ground wheels 19 are journaled on the end portions of the shaft 18.

Extending around the periphery or edge of the platform are vertically extending or raised edge portions 20. A pair of vertically extending tubular sockets 21 are rigidly connected to the forward and rearward ends of the tubular members 12. These sockets 21 are positioned in spaced relation at each end of the platform 11 and are adapted to support a removable handle bar 21' shown in Figure 3.

A material receiving tank or receptacle is designated generally by the reference character 22. The receptacle 22 includes a pair of transversely spaced side walls 23 and a bottom wall 24. The side walls 23 and the bottom wall 24 are respectively provided with forwardly and rearwardly disposed sloping or converging portions 25 and 26. Near the apex of the sloping portions 25 and 26, at each end of the cart, there are connected a pair of transversely spaced bracket members 27 suitably formed with hinge portions 27'. A supporting member, generally designated by the reference character 28, is pivotally connected to each pair of brackets 27 for hinged movement about a transverse axis. Each supporting member 28 includes a pair of leg members 29 which are connected by a laterally extending tubular member or shaft 30 which is journaled in the hinge portions of the brackets 27. A bail shaped member or handle 31 is provided for each supporting member 28. Each bail shaped member 31 includes end portions 32, each one of which is rigidly secured to the leg members 29 at substantially right angles with respect thereto. A transversely extending portion 33 connects the end portions 32.

When the three-wheel cart is primarily used for transporting milk cans or other heavy objects, the handle 21 is inserted in the tubular sockets 21 at one end of the cart. In this manner the cart may readily be pushed by the operator.

When it is desired to transport silage or feed, the material receiving tank or receptacle 22 is placed on top of the platform 12 of the cart 10. The vertically extending edge portions 20 engage the lower peripheral portions of the receptacle to secure the same against lateral and longitudinal displacement from the platform 11. In the position shown in Figures 1 and 2 the supporting members 28 are placed in a transport position with the leg members 29, of each supporting member, extending longitudinally toward one another adjacent each side of the receptacle. The transversely extending portion 33 of the bail shaped member 31 is in engagement with the upper edges of the sloping portions 25. In this manner the legs 29 are retained against downward swinging movement and the bail shaped member 31 serves as a handle which an operator may readily grasp for pushing the cart to its destination. When pushing the cart the operator merely has to grasp the transversely extending member 33.

After the cart has been moved to its destination, it may be desired to move the receptacle and to withdraw the cart therefrom. In order to accomplish this, the operator grasps one of the supporting members 28 and rotates the same until the legs 29 touch the ground. He thereupon takes a position at one end of the cart and pushes the receptacle in a longitudinal direction. As the receptacle is pushed in a longitudinal direction, the leg members against which the operator is pushing, are firmly engaged with the ground and continued longitudinal movement of the receptacle causes one end of the receptacle to be moved vertically until one of the supporting members is in the supporting position indicated in Figure 3. In this position the bail shaped member 33 engages the sloping bottom wall 26 and thereby acts as a stop. At this point one end of the receptacle still remains supported on the cart. The operator thereupon lifts the end of the receptacle from the cart and permits the remaining freely swinging supporting member to also assume the inclined position shown in Figure 3, whereupon the receptacle is now completely supported independently of the cart 10. The handle 21' may now be inserted in the tubular sockets 21 and the cart may be withdrawn from underneath the receptacle.

If it is desired to merely unload the receptacle without removing the same from the cart, the leg or supporting members are merely rotated to their downwardly freely swinging position and by virtue of the sloping sides and bottom of the receptacle the operator may readily shovel material from said receptacle.

It can thus be seen that the objects of the invention have been fully achieved and a novel construction is presented. It is to be understood that changes or modifications may be made which do not depart from the spirit of the invention as disclosed nor the scope thereof as defined in the appended claims.

What is claimed is:

1. In combination with a vehicle having a longitudinally extending platform supported on front and rear ground wheels; a receptacle positioned on said platform, means for supporting said receptacle on the ground independently of the vehicle including; transversely spaced front and rear supporting legs pivotally connected to said receptacle, said legs being swingable in an arc above said receptacle and to a position adjacent the sides of said receptacle in a transport position; and transversely extending handle members connecting each of said legs, said handle members being engageable with the receptacle and extending above said receptacle for securing said legs in their transport position.

2. In combination with a vehicle having a longitudinally extending platform supported on front and rear ground wheels; a receptacle removably positioned on said platform, said receptacle having upwardly sloping bottom portions; means for supporting said receptacle on the ground independently of the vehicle including; transversely spaced front and rear supporting legs pivotally connected adjacent the ends of the receptacle for swinging movement about transverse axes; transversely extending bail shaped members connecting each of the front and rear legs, said bail shaped members being arranged to engage the upper edges of the side portions for retaining said legs in a transport position with the legs extending substantially longitudinally toward one another along the side portions of the receptacle, said bail shaped members in said transport position also providing handle bars adapted to be grasped by an operator for moving said vehicle, said leg members being swingable in a direction toward the ground for supporting said receptacle above the platform of said vehicle, and portions on said bail shaped members engaging portions of said receptacle for positioning said legs in a supporting position in inclined relation with respect to said receptacle and for limiting the swinging movement of said leg members.

3. In combination with a vehicle having a longitudinally extending platform supported on front and rear ground wheels; a receptacle removably positioned on said platform, said receptacle having side and bottom tank portions; means for supporting said receptacle on the ground independently of the vehicle including; transversely spaced front and rear supporting legs pivotally connected to said receptacle for swinging movement about a transverse axis; transversely extending bail shaped members connecting each of the front and rear legs, said bail shaped members being arranged to engage portions of said side portions for retaining said legs in a transport position with the legs extending substantially longitudinally toward one another adjacent the side portions of said receptacle; said bail shaped members in said transport position providing handle bars adapted to be grasped by an operator for moving said vehicle, said leg members being angularly swingable in a direction toward the ground and inwardly toward said receptacle for supporting said receptacle above the platform of said vehicle, and portions of said bail members engaging said receptacle for limiting the inward swinging movement of the legs toward said receptacle.

4. In a receptacle adapted to be removably positioned on a wheeled platform, said receptacle including side and bottom portions defining a material receiving tank, transversely spaced front and rear supporting legs having their upper ends pivotally connected to said tank for swinging movement about a transverse axis, said legs extending downwardly for supporting the tank, a pair of transversely extending handle bars each respectively connecting the front and rear legs, the connection of said handle bars being substantially below the pivotal connection of the legs to the receptacle, said handle bars each including a bail shaped portion extending inwardly toward the receptacle and engaging the same for limiting the inward pivotal movement of said legs toward said receptacle, said legs being swingable in an upward outward arcuate path above said receptacle, portions of said handle bars extending transversely above said receptacle and engaging said receptacle for supporting said legs adjacent the sides of said tank in a substantially horizontal transport position.

5. In combination with a vehicle having a longitudinally extending platform supported on front and rear ground wheels; a receptacle positioned on said platform, means for supporting said receptacle on the ground independently of the vehicle including transversely spaced front and rear supporting legs pivotally connected at their upper ends to said receptacle, said legs being swingable in an arc with respect to said receptacle to a position beneath the receptacle for supporting the same on the ground independently of the vehicle, a first handle bar extending transversely between the front legs, and being connected to said legs below the pivotal connection of said legs to said receptacle, a second handle bar extending transversely between the rear legs, said second handle bar being connected to said rear legs below the pivotal connection of said legs to said receptacle, said front and rear legs and the handle bars being swingable about their pivotal connection upwardly in an arc above the receptacle to a transport position whereupon said front and rear legs extend substantially longitudinally toward each other, said handle bars including portions engaging said receptacle for securing said leg members in their transport position.

JOHN E. MORGAN.

REFERENCES CITED

The following references are of record in the file of this patent:

UNITED STATES PATENTS

| Number | Name | Date |
|---|---|---|
| 321,211 | Hard | June 30, 1885 |
| 1,049,210 | Cole, Jr. | Dec. 31, 1912 |
| 1,454,710 | Drinkwater | May 8, 1923 |
| 2,001,619 | Levoyer | May 14, 1935 |

FOREIGN PATENTS

| Number | Country | Date |
|---|---|---|
| 3,314 | Great Britain | Feb. 12, 1903 |
| 335,573 | Germany | Apr. 7, 1921 |
| 659,320 | Germany | Apr. 30, 1938 |